United States Patent [19]

Yusa et al.

[11] Patent Number: 4,904,562

[45] Date of Patent: Feb. 27, 1990

[54] PROCESS FOR PRODUCING ENCAPSULATED TONER

[75] Inventors: Hiroshi Yusa; Takaaki Kohtaki, both of Yokohama; Masuo Yamazaki, Kawasaki; Yasutaka Akashi, Yokohama, all of Japan

[73] Assignee: Canon Kabushiki Kaisha, Tokyo, Japan

[21] Appl. No.: 100,359

[22] Filed: Sep. 23, 1987

[30] Foreign Application Priority Data

| Sep. 25, 1986 | [JP] | Japan | 61-224949 |
| Sep. 25, 1986 | [JP] | Japan | 61-224950 |
| Mar. 11, 1987 | [JP] | Japan | 61-53920 |

[51] Int. Cl.$^4$ .................... G03G 13/06; G03G 9/08
[52] U.S. Cl. .................... 430/138; 430/106.6; 428/403
[58] Field of Search .............. 430/137, 138, 106.6; 428/403

[56] References Cited

U.S. PATENT DOCUMENTS

| 4,533,617 | 8/1985 | Inoue et al. | 430/111 |
| 4,576,890 | 3/1986 | Hosoi | 430/138 |
| 4,581,312 | 4/1986 | Nakahara et al. | 430/102 |
| 4,610,945 | 9/1986 | Matsuoka et al. | 430/138 |
| 4,626,490 | 12/1986 | Yamazaki et al. | 430/138 |
| 4,642,281 | 2/1987 | Kakimi et al. | 430/138 |

OTHER PUBLICATIONS

Ullmanns Encyklopadie der technischen Chemie, 4th Edition, vol. 16, 1987, p. 679.

*Primary Examiner*—John L. Goodrow
*Attorney, Agent, or Firm*—Fitzpatrick, Cella, Harper & Scinto

[57] ABSTRACT

An encapsulated toner for electrophotography is produced through a process, comprising: preparing a solution of a shell material resin set to an acidic (or basic) pH region; dispersing solid core particles in the solution to form a dispersion; changing the pH of the dispersion to a pH region, which is preferably a basic (or acidic) pH region, where the shell material resin is precipitated from the dispersion; and coating the solid core particles with the precipitated shell material resin. The shell material is preferably a proton-attracting basic (or dissociative acidic) vinyl-type copolymer and is dissolved in a pH-adjusted aqueous medium comprising water and a polar solvent, such as a lower alcohol. Thus, an encapsulated toner with excellent triboelectric chargeability and environmental characteristic is prepared without coalescence of capsules or formation of free shells.

58 Claims, 1 Drawing Sheet

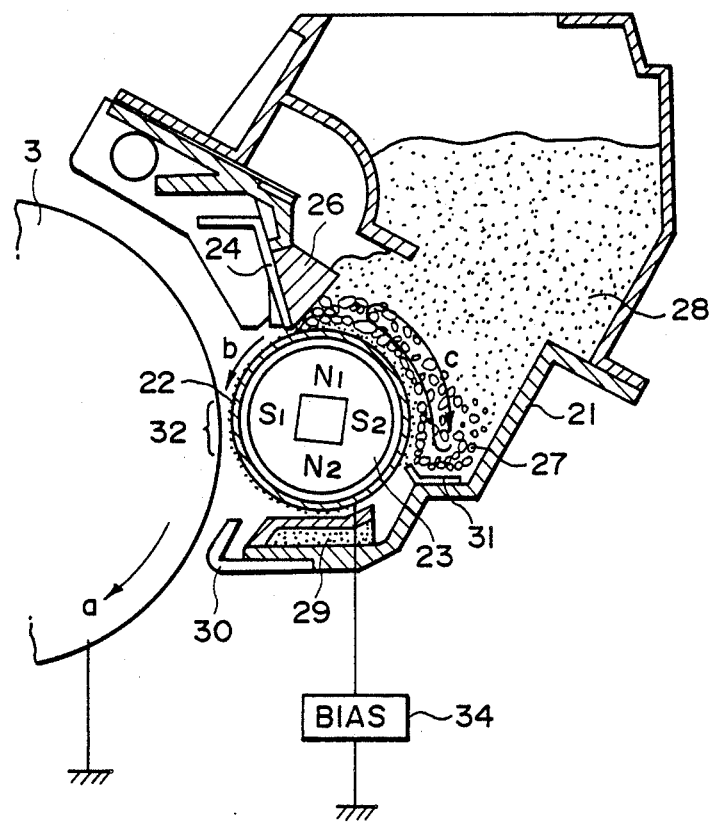

PROCESS FOR PRODUCING ENCAPSULATED TONER

FIELD OF THE INVENTION AND RELATED ART

The present invention relates to a process for producing a microcapsule-type toner used in an image forming method such as electrophotography, electrostatic printing and magnetic recording.

The toner used heretofore in electrophotography, electrostatic printing or magnetic recording has generally been prepared by mixing a dye or pigment and/or a magnetic material as desired with a resin, and kneading the mixture for dispersion, followed by pulverization into fine particles on the order of 5–30μ.

Properties required for a toner are diverse including developing characteristic, fixability, durability, stability and environmental characteristic, so that it is difficult for a single material to satisfy all of these properties. For this reason, a (micro-)encapsulated toner or (micro-)capsule toner which comprises a core material composed of a material having a good fixability, and a shell or wall of a material having a good developing characteristic coating the core material. Particularly, in recent years, a number of machines adopting a pressure-fixing system wherein a toner is crushed under pressure onto a fixing substrate (generally, a transfer paper) to effect fixing, instead of a heat-fixing system, have been proposed. The pressure-fixing system is advantageous in many respects such that no heat source is required for fixing, no danger of fire is involved, the apparatus is simplified, no waiting time is required until a fixing machine is ready, and it has a high adaptability to high speed fixing. However, a conventional copying machine using a pressure fixing system involves several problems such as a high fixing pressure, so that the fixing apparatus requires a high strength and is heavy, and the fixation product is caused to have a luster surface or be wrinkled. For this reason, it has been tried to make the toner softer so as to lower the fixing pressure. However, if the toner is softened, the toner can cause agglomeration or sticking in a developing apparatus due to a slight force so that the performances under successive operation becomes remarkably poor and the storage stability is also deteriorated.

In view of the above problems, there have been proposed a number of microencapsulated toners which comprise a soft core material coated with a hard resin as described in U.S. Pat. No. 3,788,994.

However, a still further improved microcapsule toner is expected. One reason for this is that a suitable toner material is not necessarily a good material for a microcapsule, and it is difficult to provide a microcapsule material (particularly a wall-forming material) uniformly with a developing characteristic (particularly a charge controlling characteristic) required for a toner.

There is also a problem that a wall material can peel off due to impact applied in the developing stage. Thus, it is necessary to further improve properties such as completeness and toughness of the coating in order to commercialize a microencapsulated toner.

There have been generally proposed a number of micro-encapsulation processes heretofore including the spray drying process, the electrostatic coalescence process, the drying-in-liquid process, the interfacial polymerization process, the phase separation process, the in-situ polymerization process (as disclosed in, e.g., by Tamotsu Kondo, "micro capsules" Sankyo Shuppan, K.K., 1977). However, these processes are not generally satisfactory as they are for producing microcapsulated toners.

In case of the spray drying process wherein in the encapsulation step, core particles are dispersed in a solution containing a shell material dissolved or dispersed therein, and the dispersion is ejected through a dual-fluid nozzle or a disk atomizer to form a deposition of the shell material on the surface of the core particles, there is a tendency that an encapsulated toner containing coarse particles composed of coalesced particles can be formed, and so-called free shells which are particles composed solely of the shell material are formed. In case where the interfacial polymerization is used for encapsulation, a long period of reaction is generally required, whereby the productivity is lowered. Further, the interfacial polymerization process has a very low flexibility in selection of available materials, so that it is very difficult to suitably control the characteristics as a toner, such as a triboelectric chargeability.

Further, the phase separation process or encapsulation also involves several problems. Herein, the phase separation process is a process wherein a shell material is dissolved in a good solvent showing a sufficient dissolving power for the shell material to form a solution, and a non-solvent or poor solvent having substantially no dissolving power for the shell material is added into the solution to deposit the shell material on the surface of the core particles. In this process, it is essential that the binder constituting the core particles is not dissolved or hardly soluble in the good solvent in the stage of dispersing the core particles in the good solvent. If the core particles are partially dissolved, the core material is commingled into the shell, so that instabilization of triboelectric charging characteristic and staining of the sleeve are caused. Further, the shell material once dissolved precipitates by the action of the nonsolvent to by-produce free shells (particles free of a core material) having a very high triboelectric chargeability, so that fog or ununiform toner layer on the sleeve is liable to be caused. In the phase separation process, selection of a good solvent and a non-solvent corresponding to a shell material is very important. If the selection is mistaken, the shell material is precipitated too early thereby to result in a product with poor stability and reproducibility, or the precipitation becomes too slow so that the apparatus for phase separation becomes large in size and a large proportion of solvent is required with respect to the core particles, to lower the productivity.

Further, the phase separation process requires an extremely delicate and complex temperature control.

There have been also known the complex coacervation process wherein the pH of an aqueous medium is changed to effect encapsulation. Generally in the complex coacervation process, two kinds of hydrophillic polymers having mutually opposite charges are mixed in a liquid, and the pH of the mixture liquid is charged while keeping the temperature of the mixture liquid at 40° C. or above to form coacervate around the core particles, followed by hardening of the coacervate to effect encapsulation. When the complex coacervation process is applied to preparation of an encapsulated toner, coarse encapsulated toner particles having caused coalescence of particles are liable to occur at the time of encapsulation. Further, as a hydrophilic toner is used as a shell material so that the resultant encapsulated toner is liable to be inferior in triboelectric chargeability and also in stability to environmental conditions. For this reason, it is not easy to produce through the complex coacervation process a microencapsulated toner suitably applicable to a developing process wherein a triboelectrically charged toner is used.

SUMMARY OF THE INVENTION

An object of the present invention is to provide a process for producing a microencapsulated toner having solved the above problems.

Another object of the present invention is to provide a process for producing a microencapsulated toner with a high completeness of coating or shell, good functional separation, and freeness from agglomeration or coalescence.

Another object of the present invention is to provide a process for producing a microencapsulated toner at a low cost and with good reproducibility.

According to the present invention, there is provided a process for producing an encapsulated toner, comprising:

preparing a solution of a shell material resin set to an acidic (or basic) pH region;

dispersing solid core particles in the solution to form a dispersion, changing the pH of the dispersion to a pH region, which is preferably a basic (or acidic) pH region, where the shell material resin is precipitated from the dispersion, and coating the core particles with the precipitated shell material resin.

To supplement the mechanism of the present invention, as a result of our study, it has been discovered very effective to use a solution in an aqueous medium of a shell material which comprises a proton-added form or a non-proton-added form or a dissociated form and a non-dissociated form in a certain equilibrium and cause the shell material to precipitate on core particle surfaces, whereby a microencapsulated toner with excellent stability to environmental conditions can be formed. In the present invention, a thermoplastic resin which is substantially insoluble in water at a pH in the neighborhood of 7 is preferably used as a shell material.

The above mentioned and other objects and features of the invention will be better understood upon consideration of the following detailed description concluding with specific examples of practice. In the following description, "%" and "parts" representing quantity ratios are by weight unless otherwise noted specifically.

BRIEF DESCRIPTION OF THE DRAWINGS

The sole FIGURE in the drawing is a schematic side sectional view illustrating an outline of a developing apparatus used in Example 5 appearing hereinafter.

DETAILED DESCRIPTION OF THE INVENTION

The core material, for providing a pressure-fixable toner, may for example comprise waxes such as polyethylene wax, oxidized polyethylene, paraffins, fatty acids, fatty acid esters, fatty acid amides, fatty acid metal salts, and higher alcohols; ethylenevinyl acetate copolymer resin; or cyclized rubber alone or in the form of a mixture or a reaction product thereof.

The core material may preferably comprise a binder resin obtained by heating at least two of the following resins or waxes (a)-(c) in the presence of a radical generating agent:

(a) a resin or wax with a hardness-imparting function having Vickers hardness of 2–8 kg/mm$^2$ as measured under a weight of 10 g applied for 15 sec;

(b) a resin or wax with a releasability-imparting function having a critical surface tension of 15–40 dyne/cm at 20° C.; and (c) a resin or wax with a fixability-imparting function having a compression modulus of 0.1–50 kg/mm$^2$.

The hardness-imparting function for the resin (a) is a function for providing the resultant core particles with such a degree of hardness that the core particles are not deformed or broken due to an external force exerted during encapsulation of the core particles. Because of the hardness-imparting function, the resultant encapsulated toner becomes resistant to an external force exerted during the packaging and storage period. In the case of an encapsulated magnetic toner, due to the hardness-imparting function, the toner is caused to have such a degree of hardness as to be resistant to external forces between sleeve and toner, between sleeve and blade, and between toner particles exerted during the rotation of the sleeve under a prescribed magnetic field. Further, because of the hardness-imparting function, the toner is provided with an appropriate strength against rubbing between a cleaning blade and a photosensitive drum in a cleaning step for cleaning the toner remaining on the drum after the transfer step.

The Vickers hardness used herein is based on a value measured by using a micro hardness meter (MVK-F, mfd. by Akashi Seisakusho K.K.). The measurement was conducted according to JIS Z 2244 wherein a loading speed was adjusted so as to apply a weight of 10 g for 15 seconds at a measurement temperature of 23°±5° C. Examples of the material having the function (a) may include: natural waxes such as carnauba wax (Vickers hardness, $H_V=3.6$), and candelilla wax ($H_V=4.8$), and synthetic waxes such as polyethylene wax satisfying the condition of Vickers hardness of 2–8 kg/mm$^2$.

If a material having a Vickers hardness below 2 kg/mm$^2$ is used as the material (a), the toner is broken by an external force during relative movement of the sleeve and the toner, thereby to cause sticking of the toner on the sleeve. As a result, the actions between the toner and the sleeve (such as generation of a sufficient triboelectric charge and prevention of agglomeration of toner particles) are hindered to cause coating irregularity. On the other hand, if a material having a Vickers hardness of above 8 kg/mm$^2$ is used, the pressure fixability becomes insufficient.

A particularly preferred hardness-imparting material is carnauba wax (wax containing esters between long-chain alcohols and long-chain fatty acids in a sense including a modified product thereof) having an acid value of 0–2, preferably 0–1.

When carnauba wax having an acid value exceeding 2 is used, the carnauba wax is self-emulsified during dispersion into fine particles thereof in an aqueous dispersing medium in the presence of a dispersant, so that only core particles having a very wide particle size distribution are obtained.

Carnauba wax has a very high hardness and a relatively low melt viscosity so that only a small stirring power is required for fine particle formation. With respect to a conventional problem that a preferable degree of fine particles formation cannot be effected by an ordinarily used stirrer, the use of carnauba wax is advantageous.

As a further preferred advantage, carnauba wax has an effective function of enveloping a magnetic material at the time of core particle formation.

The releasability-imparting material (b) used in the present invention preferably has a critical surface tension at 20° C. of 15–40 dyne/cm. Examples thereof include: polyvinyl fluoride (critical surface tension: $\gamma_c=28$), polytetrafluoroethylene ($\gamma_c=18.5$), polyethylene ($\gamma_c=31$), polyisobutene ($\gamma_c=27$), ethylene-propylene copolymer ($\gamma_c=28$), ethylenetetrafluoroethylene copolymer ($\gamma_c=26$–$27$), ethylenevinyl acetate copolymer ($\gamma_c=37$), isobutene-isoprene copolymer ($\gamma_c=27$), polypropylene ($\gamma_c=29$–$34$), polymethyl methacrylate ($\gamma_c=39$), and polyvinyl chloride ($\gamma_c=39$). Polyvinyl fluoride, polytetrafluoroethylene and polyethylene having a $\gamma_c$ of 15–40 dyne/cm are particularly preferred.

If a material having a surface tension of below 15 dyne/cm is used as the material (b), a sufficient interaction with the materials (a) and (c) and with the shell material is not exhibited, so that the uniform dispersion of the core particles is difficult and the effective suppression of inter-layer peeling between the core particle and the shell due to external force is not accomplished. On the other hand, if a material having a critical surface tension of over 50 dyne/cm is used, too high a hygroscopicity causes lowering in image density under a high humidity condition and filming on the photosensitive drum. Further, when core particles are formed in a wet system, self-emulsification occurs to provide only a very broad particle size distribution.

The fixability-imparting material (c) may be a material showing a compression modulus of 0.1–50 kg/mm².

The compression modulus used herein is based on a value measured according to JIS-K7208. In a particular measurement, Shimazu Autograph DCS-2000 (mfd. by Shimazu Seisakusho K.K.) was used, and a molded sample with a diameter of 12 mm and a height of 30 mm was placed on a press surface and pressed at a test speed of 9 mm/min to provide a compression stress-strain curve. The compression modulus was calculated from gradient of the initial linear portion of the curve.

Examples of the material (c) may include: paraffin wax, polyamide resin, microcrystalline wax, and ethylene-vinyl acetate copolymer. Especially preferred examples include: paraffin 155 (mfd. by Nihon Seiro K.K.; compression modulus E=10 kg/mm²), Paraffin Wax SP-0145 (Nihon Seiro K.K.; E=15 kg/mm²), Polyamide S-40E (Sanyo Kasei K.K.; E=12 kg/mm²), and Microcrystalline Wax (Nihon Chemical K.K.; E=26 kg/mm²) satisfying the condition of a compression modulus of 0.1–50 kg/mm². The fixability-imparting material or component (c) is required to be sufficiently susceptible to a stress applied from a fixing device when a non-fixed image is fixed on a recording sheet by the fixing device. If the material is excessively deformed under an external force, the deformation reaches the interior of the recording sheet, so that the interfacial strength between the toner and the sheet increases, but on the other hand, the fixed image becomes weak against rubbing with a cloth or eraser rubber. If a material having a compression modulus of below 0.1 kg/mm² is used as the material (c), "collapse" or "blurring" of images occur. On the other hand, if a material having a compression modulus of above 50 kg/mm² is used, the fixability is remarkably deteriorated to such an extent that the fixed image is peeled off from the recording sheet.

The amounts of the materials (a), (b) and (c) used in the present invention may preferably be such that the material (a) is 5–60 wt. parts, preferably 10–50 wt. parts; the material (b) is 5–60 wt. parts, preferably 10–50 wt. parts; and the material (c) is 20–90 wt. parts, preferably 20–80 wt. parts, respectively, per 100 wt. parts of the total binder resin in the core material.

In the present invention, a mixture comprising at least two of the above mentioned three components, i.e., (a) the hardness-imparting material, (b) the releasability-imparting material, and (c) the fixability-imparting material, may preferably be heat-treated in the presence of a radical generating agent.

The reactions caused by the heat treatment may be radical reactions such as a hydrogen withdrawal reaction due to a radical generated by the radical generating agent or heating, and a crosslinking reaction within or between molecules. It is preferred for the purpose of heat treatment that the radical generator is reacted in the absence of a solvent such as an organic solvent dissolving a resin.

A polymerization initiator is preferably used as a radical generator because generation of radicals may be effected easily and reliably at a relatively low temperature.

Examples of radical polymerization initiators suitably used for this purpose include: peroxides as shown in Table 1 below; hydroperoxides such as cumene hydroperoxide; alkyl peroxides such as di-tert-butyl peroxide; potassium peroxosulfate and ammonium peroxosulfate; hydrogen peroxide; and 2,2'-azobisisobutyronitrile.

In view of the safety, availability and reactivity, hydrogen peroxide and n-butyl-4,4-bistert-butyl peroxyvaleate (a commercially available example: Perhexa V, mfd. by Nihon Yushi K.K.) are especially preferred.

TABLE 1

| Representative Organic Peroxides | |
|---|---|
| Organic peroxides | 10 hr half-life temperature (°C.) |
| acetylcyclohexylsulfonyl peroxide | 26.5 |
| isobutyl peroxide | 32.5 |
| cumyl peroxyneodecanoate | 36.6 |
| di-n-propyl peroxydicarbonate | 40.5 |
| t-butyl peroxyneodecanoate | 46.5 |
| 2,4-dichlorobenzoyl peroxide | 53 |
| 3,5,5-trimethylhexanoyl peroxide | 59.5 |
| octanoyl peroxide | 61 |
| decanoyl peroxide | 62 |
| lauroyl peroxide | 62 |
| succinic acid peroxide | 66 |
| acetyl peroxide | 68 |
| benzoyl peroxide | 74 |
| t-butyl peroxymaleate | 96 |
| cyclohexanone peroxide | 97 |
| t-butyl peroxyacetate | 102 |
| t-butyl peroxybenzoate | 104 |
| n-butyl-4,4-bis-t-butyl peroxyvaleate | 105 |
| methyl ethyl ketone peroxide | 109 |
| dicumyl peroxide | 117 |
| t-butylcumyl peroxide | 120 |
| cumene hydroperoxide | 158 |

The heat treatment in the presence of a radical generator provides the core material with properties which have not been expected heretofore. More specifically, the phase separation and migration with the elapse of time of the hardness-imparting component, the releasability-imparting component and/or the fixability-imparting component contained in the core material, may be prevented, whereby core particles which are uniform mechanically and in respects of electrophotographic characteristics are formed.

As a component of core material in the present invention, an effectively functioning compound may be imparted at the time of formation of the core particles. For example, when core particles are produced in an aqueous medium in the presence of a hardly water-soluble or sparingly water-soluble dispersant, it is preferred to combine a cationic or anionic compound inducing a charge opposite to that of the charge induced by dissociation of the dispersant in the aqueous medium. It is a general practice that a dispersant having a particle size smaller enough compared with core particles to be obtained, when the core particles are produced in an aqueous medium in the presence of the hardly water-soluble dispersant. The dispersant having a very small particle size is energetically activated and has a characteristic of selectively adhering onto the particle surfaces. In case where a polar liquid such as water is used as a dispersion medium as in the present invention, it is advantageous that the dispersant also has a functional group having a strong polarity. Desired fine particle formation is effected because such a dispersant occupies the surface of the core particles to cause an ionic interaction. The dispersant having a functional group remaining on the core particles after the particle formation can be removed before the encapsulation step. The amount of the hardly water-soluble dispersant may be arbitrarily selected to obtain a desired particle size.

It is however insufficient to only use a selected dispersant in order to obtain a uniform size of core particles because the dispersant particles do not necessarily attach selectively and uniformly onto only the surface of the core particles. For this reason, in order for the dispersant to uniformly attach onto the surface of the core particles, it is essential to further incorporate in the core material to be formed into fine particles a cationic (cation-providing) compound or anionic (anion-providing) compound inducing an electric charge opposite to an electric charge induced by dissociation of the dispersant in the aqueous medium.

Examples of dispersants capable of being dissociated into anions include inorganic fine powder such as silica and bentonite. In contrast thereto, as cationic compounds, hydrophobic amines may generally be used. Particularly preferred cationic compounds are long-chain aliphatic amines and a grafted compound produced from polyethylene and an amine group-containing monomer. Specific examples thereof are Duomeen T (Lion Armour Co.) which is N-alkyltrimethylenediamine ($R-NH-C_3H_6-NH_2$, R is an alkyl residue from an aliphatic acid); and an amino-modified wax obtained by hot-melting polyethylene, adding thereto a non-protonic polar solvent containing an amino group-containing vinyl monomer and a radical initiator, and further heating the mixture.

On the other hand, an example of the dispersant dissociatable as cations in water is aluminum oxide. Examples of anionic compounds used in combination therewith include hydrophobic long-chain aliphatic carboxylic acids such as stearic acid and oleic acid; long-chain aliphatic dicarboxylic acids, carboxylic acid anhydrides, reaction products of $C_8$-α-olefin having 8 carbon atoms and maleic anhydride, and half ester thereof.

The core particles to be used in the present invention may be prepared by using a core material as described above through various production methods. Preferable examples of such core particle production methods include an electrostatic spraying method as disclosed in Japanese Laid-Open Patent Application JP-A No. 58-216736 wherein a core material is supplied with a DC voltage and is discharged through a disk atomizer; a melt spraying method as disclosed in JP-A No. 59-120263 wherein a dual fluid nozzle is used to form core particles; and a suspension granulation method as disclosed in JP-A No. 59-127062 wherein granulation is performed in an aqueous medium. In the present invention, a method of granulating a core material in an aqueous medium to form core particles is particularly preferred because a sharp particle size distribution is attained.

It is preferred that the core particles used in the present invention have an average particle size of 0.4–99 μm, particularly 4–19 μm, in terms of a volume-average particle size.

In case of providing the encapsulated toner according to the present invention in the form of a magnetic toner, examples of the magnetic substance to be incorporated in the core material include ferroelectric elements such a iron, cobalt, nickel and manganese, and alloys or compounds containing these elements such as magnetite and ferrites. Further, particles of the magnetic substance may be treated with a hydrophobicity-imparting agent such as silane coupling agents and titanate coupling agents or a surfactant. The amount of the magnetic substance may preferably be 15–180 parts, particularly 50–150 parts, per 100 parts of the total amount of the resinous components in the core material.

In the core material of the present invention, a core material may be used in combination with or instead of the magnetic substance as described above. Examples thereof include various types of carbon black, Aniline Black, Naphthol Yellow, Molybdenum Orange, Rhodamine Lake, Alizarine Lake, Methyl Violet Lake, Phthalocyanine Blue, Nigrosine, Methylene Blue, Rose Bengal, Quinoline Yellow, Nigrosine dyes, Lamp Black, Sudan Black SM, Fast Yellow G, Benzidine Yellow, Pigment Yellow, Indofast Orange, Irgadine Red, Paranitroaniline Red, Toluidine Red, Carmine FB, Permanent Bordeau FRR, Pigment Orange R, Lithol Red 2G, Lake Red C, Rhodamine FB, Rhodamine B Lake, Methyl Violet B Lake, Pigment Blue, Brilliant Green B, Phthalocyanine Green, Oil Yellow GG, Zapon Fast Yellow CGG, Kayaset Y 963, Kayaset YG, Smiplast Yellow GG, Zapon Fast Orange RR, Oil Scarlet, Smiplast Orange G, Orazol Brown B, Zapon Fast Scarlet CG, Aizenspiron Red BEH and Oil Pink OP.

It is generally preferred that the content of the binder, when added, may be 0.1–20 parts per 100 parts of the binder resin of the core particles.

Further, it is preferred from the viewpoints of fixability and production that the melt mixture of the core material comprising the binder resin, a colorant and/or a magnetic substance for forming core particles has an apparent viscosity measured at 120° C. and a shear rate of 10 $sec^{-1}$ which is 1/5 or below of an apparent viscosity measured at 120° C. and at a shear rate of 0.5 $sec^{-1}$.

The property or phenomenon providing a lower apparent viscosity at a higher shear rate is generally called "thixotropy". A core material showing a large degree of thixotropy promotes the deformation of the toner between pressure rollers at the time of pressure fixation to improve the fixability.

As will be described hereinafter, in a process wherein the core material is melt-kneaded, charged into an aqueous medium, and formed into particles by providing thereto a strong shearing force by means of a stirrer such as a homomixer in the presence of an emulsifier, the particle formation is promoted by a lower apparent viscosity of the core material at the time of the shear mixing. On the other hand, after the shear mixing, a higher apparent density minimizes the coalescence of particles, and agglomeration and localization of the additives such as colorant and/or magnetic substance in the core particles.

While viscosity measurement may be effected by means of various viscometers, the viscosity used herein is based on measurement by means of a rotor-type (rotating double cylinder-type) viscometer.

The shear rate D is given by the following equation for a rotor-type viscometer:

$$D = \frac{2\omega}{1 - (Rb/Rc)^2} = \frac{2 \cdot \frac{2\pi N}{60}}{1 - (Rb/Rc)^2} = \frac{0.2094N}{1 - (Rb/Rc)^2} \ (sec^{-1}),$$

wherein Rc: cup radius (cm), Rb: rotor radius (cm), h: rotor height (cm), $\omega$: rotor rotation angular velocity (sec$^{-1}$), and N: rotation number (rpm).

Further, the shear stress S is given by: $S = M/2\pi Rb^2 h$ wherein M is a viscosity torque, and the viscosity $\eta$ is given by $\eta = S/D$. As a result, the shear stress and the viscosity can be obtained from the shape factors of the rotor and the measured torque.

A binder resin having a pressure-fixability generally has a relatively low melt viscosity, so that there is a tendency that a sufficient shearing force does not act between the colorant and/or magnetic substance and the binder resin. As a result, the dispersion of the colorant and/or magnetic substance becomes insufficient, so that some toner particles can contain no colorant, or a large number of toner particles can contain localized colorant. This leads to a decrease in toner performances and provides ill effects to the image characteristic, durability and stability.

Accordingly, it is desired that the colorant particles (in a sense, inclusive of magnetic particles) in the toner particles are dispersed in a particle size of 5$\mu$ or smaller, preferably 2$\mu$ or smaller. For this purpose, rather than twin rollers and a biaxial extrusion kneader used heretofore for melt dispersion of toner components, it is preferred to use an attritor, a ball mill or a sand mill wherein solid dispersing media are incorporated for effecting melt-kneading and dispersion for a sufficient length of time.

The degree of dispersion of colorant particles can be examined by dispersing toner particles in an embedding resin such as an epoxy resin, followed by hardening, slicing the hardened resin into a very thin sample by means of a microtome, and observing the sample through a transmission-type electron microscope. The dispersion degree may also be checked by using a particle size gauge (e.g., Grind Gauge Model III, available from Yoshimitsu Seiki K.K.).

Hereinabove, explanation has been made mainly with respect to the core material used in the process for producing an encapsulated toner according to the present invention.

On the other hand, the shell material used in the present invention may preferably be a hydrophobic thermoplastic resin showing a good triboelectric chargeability not only under normal temperature-normal humidity conditions, as a matter of course, but also under high temperature-high humidity conditions. A preferred class of shell material comprises a vinyl copolymer which is substantially insoluble in water at pH 7. The vinyl copolymer may preferably show (A) a film-formability capable of providing a film showing good mechanical properties and thermal properties; (B1) a proton-attracting function capable of forming a proton-added product under the action of an acidifying agent in an aqueous medium; and (C) a solubility-promoting function for providing the proton-added product with a solubility in an aqueous medium, in combination.

The shell material may preferably be a resin having a number-average molecular weight of 5,000-40,000, particularly 10,000-30,000. The resin may preferably be a thermoplastic resin which shows a ratio (Mw/Mn) of weight-average molecular weight (Mw) to number-average molecular weight (Mn) as a measure of monodispersibility in molecular weight in the range of 1.5-4.5, and a glass transition temperature (Tg) of 40° C. or higher, preferably 60°-120° C.; contains no crosslinking; and is stable against moisture.

It is, however, difficult for a resin synthesized from a single monomer species to satisfy all of the functions (A), (B1) and (C) as described above, so that a copolymer of plural monomers is preferably used in general. More specifically, a copolymer resin of monomer species selected from the following groups each mainly providing one of the above functions, is provided.

A monomer (A) mainly providing, when copolymerized, the above function (A) may preferably be an aromatic monomer, such as styrene (St), $\alpha$-chlorostyrene, $\alpha$-methylstyrene, allylbenzene, phenylacetylene, vinylnaphthalene, 4-methylstyrene, 2,4-dimethylstyrene, 3-ethylstyrene, 2,4-diethylstyrene, 2-methoxystyrene, 4-chlorostyrene, 4-fluorostyrene, 3-iodostyrene, 4-cyanostyrene, and 3-nitrostyrene.

A monomer (B1) used for mainly providing the above proton-attracting function (B1) may preferably be a nitrogen-containing aliphatic monomer, such as N,N-dimethylaminoethyl methacrylate (DM), N,N-dimethylaminoethyl acrylate, N,N-diethylaminoethyl methacrylate (DE), N,N-diethylaminoethyl acrylate, N,N-dibutylaminoethyl acrylate, N,N-dibutylaminoethyl methacrylate (DB), 2-piperidinoethyl methacrylate, and 2-piperidinoethyl acrylate.

A monomer (A - B1) used for providing the above functions (A) and (B1) in combination may preferably be a nitrogen-containing aromatic monomer, such as vinylpyridine, vinylcarbazole, 5-ethyl-2-vinylpyridine, 2-methyl-5-vinylpyridine, N,N-divinylaniline, trans-1,2-bis(2-pyridyl)ethylene, 2-vinylquinoline, 2-(N,N-dimethylamino)-4-vinylpyrimidine, 4-vinylpyrimidine, 3-cinnamoylpyridine, 4-methacryloxybenzylideneaniline, diallylmelamine, 2,4-dimethyl-6-vinyltriazine, and N-vinylimidazole.

A monomer (C) used for providing the above function (C) may preferably be selected from: ethylenically unsaturated olefins, such as ethylene, propylene, isoprene (IP), butadiene (BD), butylene and isobutylene; vinyl halides, such as vinyl chloride, vinylidene chloride, vinyl bromide, and vinyl fluoride; vinyl esters, such as vinyl acetate, vinyl propionate and vinyl benzoate; acrylic acid or methacrylic acid esters, such as methyl methacrylate (MMA), ethyl methacrylate, propyl methacrylate, n-butyl methacrylate (BMA), isobutyl methacrylate, n-octyl methacrylate, dodecyl methacrylate, 2-ethylhexyl methacrylate (2EHMA), stearyl methacrylate, phenyl methacrylate, methyl methacrylate, methyl acrylate, ethyl acrylate, n-butyl acrylate (BA), isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers, such as vinyl methyl ether, vinyl ethyl ether, and vinyl isobutyl ether; vinyl ketones, such as vinyl methyl ketone, vinyl hexyl ketone, and methyl isopropenyl ketone; and aliphatic vinyl monomers, such as acrylonitrile (AN), acrolein, acrylamide, maleic anhydride (MA), and dimer acids.

The shell material of the present invention may preferably be a vinyl copolymer, preferable examples of which include: ternary copolymers, such as St-MMA-DM copolymer, St-MMA-DE copolymer, St-2EHA-DM copolymer, and St-2EHMA-DM copolymer; and quaternary copolymers including two components for providing the function (C), such as St-MMA-2EHA-DM copolymer, St-MMA-BMA-DM copolymer, St-MMA-BD-DM copolymer, St-MMA-IP-DM copolymer, and St-AN-MMA-DM copolymer.

Another class of the shell material may preferably be a thermoplastic resin, preferably a vinyl copolymer, which shows (A) a film-formability as described above, (B2) a dissociative function capable of forming a dissociated product under the action of a basifying agent in an aqueous medium; and (C) a solubility-promoting function as described above.

Preferred resin characteristics such as molecular weights of this class of shell materials are similar to those described with respect to the abovementioned preferred class of the shell material. However, it is further preferred for this class of shell material resin to have an acid value of 5–200, particularly 20–120.

In order to provide a shell material resin satisfying the above-mentioned functions (A), (B2) and (C) in combination, a copolymer resin of monomer species selected from the following groups each mainly providing one of the above functions, may be used.

A monomer (A) used for providing the above function (A) may preferably be selected from the group consisting of: styrene; halogen-substituted styrene monomers, such as chlorostyrene, bromostyrene, and fluorostyrene; monoalkyl- or mono-aryl-substituted styrene monomers, such as dodecylstyrene, decylstyrene, ethoxystyrene, ethylstyrene, hexylstyrene, isopropylstyrene, phenoxystyrene, and phenylstyrene; polyalkylor poly-aryl-substituted styrene monomers, such as dimethylstyrene, trimethylstyrene, and diethylstyrene.

A monomer (B2) used for providing the function (B2) may be an aliphatic carboxylic acid monomer inclusive of acrylic acid; methacrylic acid (MAA); and mono-esters, particularly mono-alkyl esters, of maleic acid generally derived from maleic anhydride, such as monomethyl maleate, monoethyl maleate, mono-n-propyl maleate (n-PA-MA), mono-isopropyl maleate (IPA-MA), and monobutyl maleate (BA-MA).

A monomer (C) used for providing the function (C) may be selected from: acrylic acid esters, such as methyl acrylate, ethyl acrylate, isopropyl acrylate, n-butyl acrylate, isobutyl acrylate, sec-butyl acrylate, tert-butyl acrylate, hexyl acrylate, heptyl acrylate, 2-ethylhexyl acrylate, fluorinated methyl acrylate, cyclohexyl acrylate, and phenyl acrylate; methacrylic acid esters, such as methyl methacrylate, ethyl methacrylate, isopropyl methacrylate, n-propyl methacrylate, n-butyl methacrylate, isobutyl methacrylate, benzyl methacrylate, hexyl methacrylate, heptyl methacrylate, and 2-ethylhexyl methacrylate; maleic acid diesters, such as dimethyl maleate, diethyl maleate, diisopropyl maleate, and di-n-propyl maleate; acrylonitrile, ethylene halide, and vinyl acetate.

It is generally preferred in the present invention that the above-mentioned functions (A), (B2) and (C) are provided by using different monomer species, but it is possible that a monomer (B2) providing the dissociative function (B2) functions also as a monomer (C) for providing the function (C).

Specific examples of the resin showing the functions (A), (B2) and (C) in combination may include binary or ternary copolymers, such as St-(IPA-MA) copolymer, St-(n-PA-MA) copolymer, St-(n-BA-MA) copolymer, St-MAA copolymer, St-(IPA-MA)-MMA copolymer, St-(n-PA-MA)-MMA copolymer and St-MAA-MMA copolymer.

The monomers (A), (B1 or B2) and (C) constituting a copolymer may preferably have molar proportions in the range of (A):(B1 or B2):(C)=(30–90):(5–65): (5–30) mole % based on the total monomers constituting the copolymer as 100 mol %.

If the monomer (A) is below 30 mol %, a layer of the resultant toner formed on a sleeve (toner-carrying member in a developing apparatus) which rotates while facing a photosensitive drum (latent image-bearing member) is liable to be collapsed under the action of a force applied to the toner between the toner thickness regulating blade and the sleeve and a force applied to the toner from the surface of the sleeve rotating in resistance to the external magnetic force, whereby sticking onto the sleeve occurs and irregularity of the toner coating layer is caused on the sleeve. Further, there is caused a problem that a part of the toner for developing on the surface of the photosensitive member is supplied with an external force between a cleaning member and the photosensitive member in the cleaning step to cause toner sticking onto the photosensitive drum, which gives rise to irregularities such as occurrence of streaks in developed image.

On the other hand, if the monomer (A) exceeds 90 mol %, the amounts of the monomers (B1 or B2) and (C) are relatively decreased, so that it becomes difficult to solubilize the shell material in the aqueous medium even under the action of an acidifying agent or basifying agent.

If the monomer (B1) or (B2) is below 5 mol %, the solubilization of the shell material is hindered. On the other hand, if the proportion exceeds 65 mol %, there is an increased tendency that the stability of the toner at a high temperature becomes poor and the Tg value required of the toner is not satisfied.

If the monomer (C) is below 5 mol %, it become difficult to solubilize the shell material in the form of a proton-added product formed under the action of an acidifying agent or a dissociated product formed under the action of a basifying agent in an aqueous medium. On the other hand, if the proportion exceeds 30 mol %, the film-formability on the core particles of the shell material is liable to be insufficient while the solubility of the proton-added product or dissociated product in an aqueous medium becomes sufficiently high.

Between the above two classes of shell material resins, one having the combined functions of (A), (B1) and (C) is preferred in view of the desired hydrophobicity of the resultant toner.

The shell material to be used in the present can supplementally comprise, in addition to the above mentioned resin formed from the monomers (A), (B1 or B2) and (C), another resin, such as polyester, polycarbonate, polysulfonate, polyamide, polyurethane, polyurea, epoxy resin, rosin, modified rosin, terpene resin, phenolic resin, aliphatic or alicyclic hydrocarbon resin, aromatic petroleum resin, melamine resin, polyether resin such as polyphenylene oxide, and thioether resin as far as it does not provide an ill effect to the present invention.

The amount of the shell material for coating the core particles depends on the surface shape of the core particles, the densities of the core material and the shell material, and the particle size of the core particles and is not determined in a single way. It is, however, desirable in view of the toner properties in the present invention to determine the amount of the shell material to be added based on the prescribed thickness from the following equation:

$$W = \frac{6 \cdot \rho \cdot S \cdot \delta}{G \cdot D},$$

wherein $\delta$: prescribed shell thickness ($\mu$m), W: amount of the shell material to be charged, $\rho$: density of the shell material, G: density of the core particles, S: charged amount of the core particles, and D: volume-average particle size of the core particles.

The volume-average particle size of the core particles D may be obtained in the following manner. An aqueous saline solution of about 1%-concentration is charged in a beaker in a proportion of 1/5 of the latter, and a small amount of core particles are dispersed therein for about 60 seconds by means of an ultrasonic washer. Further, an additional 1%-aqueous saline solution is added so as to provide a core particle concentration of 5–10% and then the mixture is again subjected to ultrasonic dispersion to form a sample. The sample is subjected to measurement by means of a Coulter counter TA-II (mfd. by Coulter Electronics Co.) to obtain a volume-average particle size D.

In the present invention, the shell thickness $\delta$ is preferably set to 0.01–2.0 $\mu$m, further preferably 0.05–1.0 $\mu$m. If the thickness is below 0.01 $\mu$m, a core particle is not completely coated with the shell material to provide a defective shell, whereby stable triboelectric charging is not effected during development under a high humidity condition and the toner is liable to stick onto a photosensitive drum. On the other hand, if the shell thickness exceeds 2.0 $\mu$m, the toner is caused to have too high a resistivity so that the toner is liable to provide an ununiform coating on a sleeve during development under a low humidity condition.

The encapsulated toner obtained by the present invention may have an average particle size (volume-average particle size of ordinarily 0.5–100 $\mu$m, preferably 5–20 $\mu$m.

In the present invention, the above shell material is supplied to the step of coating the core particles in the form of a solution wherein the shell material is dissolved in an aqueous medium set to an acidic pH region or a basic pH region.

The method of forming such a shell material solution is not particularly restricted. For example, such a solution can be prepared through solution polymerization.

It is, however, desirable in order to improve the environmental stability of the resultant toner that the above shell material is dissolved in an aqueous medium with the aid of an acidifying agent or basifying agent to provide a shell material solution.

Core particles are dispersed in advance in an aqueous medium comprising such a shell material solution, and the pH of the dispersion is changed to a pH region where the shell material becomes insoluble, whereby the shell material is deposited to fully coat the core particle surfaces.

As the aqueous medium used in the present invention, a solvent or liquid medium satisfying one or more of the following conditions (1)–(4) is preferably used:

(1) It is desirable to use a solvent in which the shell material can stably form a proton-added product or dissociated product in the presence of an acidifying agent or basifying agent. For this purpose, it is desirable to use a solvent having a strong polarity capable of completely dissolving the shell material therein by the addition of an acidifying agent or basifying agent. In the present invention, a solvent having a strong polarity refers to a solvent which is sufficiently water-miscible and has a solubility parameter of 11.0 or higher (as described in "Polymer Handbook" Second Edition IV, 337–359).

(2) It is desirable to use a solvent wherein the viscosity therein does not substantially increase at the time when the shell material becomes insoluble. In a system wherein a solvent of increasing the viscosity at the time of shell material precipitation is used, sufficient stirring is not effected, whereby precipitated material is not selectively deposited on the core particles but forms a large number of free shell particles consisting only of the shell material, and further agglomerated and coalesced encapsulated toner particles are formed in an increased proportion.

(3) A solvent of a low boiling point is preferred in view of recovery and reuse of the solvent.

(4) It is preferred to use a solvent which does not substantially dissolve the core particles. If the core particles are dissolved when they are dispersed in an aqueous medium, encapsulated toner particles which comprise core material not containing magnetic particles or colorant are liable to be by-produced in a subsequent step for precipitating the shell material, or the dissolved core material is liable to instabilize minute droplets which occur at the initial stage of the shell material precipitation to cause by-production of free shells not containing the core particles.

Specific examples of the solvent preferably used in the present invention are given in the following Table 2.

TABLE 2

Examples of Polar Solvents

| Solvent | Solubility parameter (cal/cm$^3$)$^{\frac{1}{2}}$ | Mutual solubility with water | Boiling point (°C.) |
|---|---|---|---|
| water | 23.4 | — | 100 |
| glycerine | 16.5 | o | 290 |
| ethylene glycol | 14.6 | o | 198 |
| methanol | 14.5 | o | 64.5 |
| ethanol | 12.7 | o | 78.3 |
| propylene glycol | 12.6 | o | 188 |
| furfuryl alcohol | 12.5 | o | 170 |
| benzyl alcohol | 12.1 | o | 205 |
| n-propyl alcohol | 11.9 | o | 97 |
| allyl alcohol | 11.8 | o | 96 |
| isopropyl alcohol | 11.5 | o | 82.5 |

TABLE 2-continued

Examples of Polar Solvents

| Solvent | Solubility parameter (cal/cm$^3$)$^{\frac{1}{2}}$ | Mutual solubility with water | Boiling point (°C.) |
|---|---|---|---|
| cyclohexanol | 11.4 | Δ3.6% | 161 |
| butyl alcohol | 11.4 | Δ10/100 | 117 |

In the present invention, it is most preferred to use water as a single solvent for encapsulation, but it is generally particularly preferred to use a mixture solvent system of water and a lower alcohol in order to satisfy the above conditions. In this instance, the mixing ratio between water and the lower alcohol (preferably having 1–5 carbon atoms) largely depends on the shell material used. Generally speaking, however, the mixing ratio is preferably determined to satisfy the following equation for a mixing factor (D):

$$D = E/N = 0.05 \text{ to } 6,$$

wherein E is the weight ratio of the lower alcohol to water, (weight of the lower alcohol/weight of water, and N is a value obtained by dividing the number-average molecular weight of the shell material by a factor of 10,000. It is further preferable to mix them so as to satisfy D=0.1 to 4.

If the above mixing factor (D) is below 0.05, the kind of shell material which can be dissolved in the aqueous medium is restricted, and particularly it becomes impossible to use a high molecular weight resin from the restriction of solubility. Further, when the shell material dissolved with the acid of an acidifying agent (or basifying agent) is precipitated preferably with the aid of a basifying agent (or acidifying agent), the viscosity of the shell material solution becomes too high, so that sufficient stirring is not effected, thus resulting in occurrence of free shells and coalesced encapsulated toners.

On the other hand, if the mixing factor (D) is larger than 6, the solution viscosity at the time of shell material precipitation is lowered and the load of stirring is lowered, but there arises a tendency that the shell material is swollen or partly dissolved and the solidification of the shell material becomes difficult even after the encapsulation, whereby the post treatment becomes extremely complicated. Further, the stability of emulsion of the precipitated shell material becomes poor so that the selective deposition onto the core particles is not readily effected but the shell material is liable to cause sticking onto mechanical parts, such as vessel and stirrer.

The amount of the solvent with respect to the core particles containing magnetic substance and/or colorant is preferably as small as possible in view of productivity. It is generally preferred to disperse 10–50 parts of the core particles per 100 parts of the solvent for encapsulation.

In the present invention, it is possible to add another polar solvent in the aqueous medium, e.g., for the purpose of providing a smooth shell film. Examples of such another polar solvent may include: cellosolves, such as ethylene glycol diacetate, ethylene glycol dimethyl ether, ethylene glycol monoacetate, ethylene glycol monobutyl ether, ethylene glycol monoethyl ether, ethylene glycol monoethyl ether acetate, ethylene glycol monomethyl ether, and ethylene glycol monomethyl ether acetate; polar non-proton-donative solvent, such as acetonitrile, dioxane, dimethylformamide, dimethylsulfoxide, dimethylacetoamide, and dimethylurea.

The concentration of the shell material resin to be dissolved in the aqueous medium with the aid of an acidifying agent or a basifying agent may preferably be 0.5–20 parts, particularly 1.0–10 parts, per 100 parts of the aqueous medium.

If the shell material concentration is below 0.5 part, too large a production apparatus is required and much cost is required for recovery of the solvent. On the other hand, if the shell material concentration exceeds 20 parts, the viscosity of the solution is increased to make difficult the stirring at the time of shell material precipitation, whereby there arises a tendency that free shells and coalesced toners increase.

In the present invention, it is preferred to dissolve the shell material to form a solution thereof by adding an acidifying agent or basifying agent into the aqueous medium to bring the system to an acidic or basic pH region. In this instance, the pH region or value where the shell material is solubilized depends to some extent on the kind of the aqueous medium, the formulation ratio, the kind of the film formability imparting monomer (A), the kind of the solubilizing monomer (C), the molecular weight and the ion intensity. In general, as the proton-additive monomer (B1) has a pKb in the range of 7±2, it is preferred that the pH value is set so as to provide 90% or higher of the ionization rate of the monomer (B1) as defined by the following equation:

$$\text{Ionization rate (\%) for } (B1) = \frac{100}{1 + \text{anti-log } (pH - pKa)}$$

It is generally preferred to adjust the pH value to 5±1.5 by using the acidifying agent.

In order to precipitate the shell material, it is generally preferred to bring the system to an alkaline pH region by adding an ordinary basifying agent (especially when the shell material has a precipitability in an alkaline region). As the basifying agent to be used for this purpose, it is also possible to use a pH buffer solution in addition to an ordinary organic base or inorganic base.

On the other hand, the dissociative monomer (B2) generally has a pKa of 4±2. When the monomer (B2) has a pKa of 4, it is generally preferred that the pH value is set to the range of 8–10 so as to provide 99.99% or higher of the ionization rate of the monomer (B2) as defined by the following equation:

$$\text{Ionization rate (\%) for } (B2) = \frac{100}{1 + \text{anti-log } (pKa - pH)}.$$

In order to precipitate the shell material, it is generally preferred to bring the system to an acidic pH region by adding an ordinary acidifying agent (especially when the shell material has a precipitability in an acidic region). As the acidifying agent, it is possible use a pH buffer solution in addition to an ordinary organic acid or inorganic acid.

In the present invention, it is possible to proceed with the encapsulation at an elevated temperature or room temperature under the above pH condition. It is, however, preferred that the encapsulation is effected at a temperature of −10° to +30° C., further preferably −10° to +15° C. in order to completely deposit the shell material on the core particles and prevent the sticking of the shell material onto mechanical parts and further to prevent the elution of the core particles. An encapsulation temperature of below −10° C. results in complication of the apparatus and increase in running cost. On the other hand, an encapsulation temperature of above 30° C. tends to increase the sticking of the shell material onto mechanical parts and elution of the core particles and is therefore not desirable.

In the present invention, preferred examples of the basifying agent may include inorganic bases, such as sodium hydroxide, potassium hydroxide, calcium hydroxide, ammonia gas, and ammonia water; and organic bases, such as ethylenediamine, diethylenetriamine, and triethylenediamine. Ammonia water is particularly preferred in view of pH control and post treatment. The ammonia water may preferably have an ammonia concentration of 5–30% in view of pH control function.

On the other hand, preferred examples of the acidifying agent may include: inorganic acids, such as hydrochloric acid, sulfuric acid, and phosphoric acid; and organic acid, such as formic acid, acetic acid and succinic acid. Among these, acetic acid is particularly preferred in view of pH control and post treatment.

In the present invention, the addition rate of basifying agent or acidifying agent should preferably be set to satisfy the following relationship:

$$(H/F \times G) = 0.005 \text{ to } 20,$$

wherein F: shell material concentration in the aqueous medium (g/l), G: the volume of the aqueous medium (l), and H: addition rate of the basifying agent or acidifying agent (ml/min). It is particularly preferred to control the addition rate so that the value $(H/F \times G)$ of the above formula is in the range of 0.01 to 10.

If the above value $(H/F \times G)$ is below 0.005, it takes too much time for the encapsulation to lower the productivity. Further, in the process of the present invention, the shell material resin is precipitated first in the form of viscous droplets and then gradually solidified. Therefore, if the addition rate of the acidifying agent or basifying agent is too slow, coalescence of core particles is promoted by gradually precipitated viscous shell material. On the other hand, if the value $(H/F \times G)$ exceeds 20, precipitated emulsion particles of shell particles are not completely adsorbed but are liable to form free shells and promote coalescence of toner particles.

As described above, according to the present invention, there is provided a process for producing an encapsulated toner wherein a shell material dissolved in an aqueous medium is suitably insolubilized by controlling the equilibrium between the proton-added form and non-proton-added form or between the dissociated form and non-dissociated form of the shell material through pH control of the system so that the precipitated shell material is caused to coat core particles dispersed in the aqueous medium in a satisfactory manner. According to the process of the present invention, a micro-encapsulated toner excellent in function separation is produced at a low cost and a good reproducibility while suppressing agglomeration or coalescence of encapsulated toner particles and occurrence of free shells.

Hereinbelow, the present invention will be explained with references to specific examples.

EXAMPLE 1

1 kg of commercially available carnauba wax (mfd. by Noda Wax K.K.) was charged in a 2 l-four-necked flask, and the flask was evacuated to a reduced pressure of 1–2 mmHg in a nitrogen atmosphere. While maintaining the reduced pressure, the content of the flask was heated to 250° C. and reacted for 8 hours. The carnauba wax thus treated had an acid value of 0.5.

400 g of the treated carnauba wax (Vickers hardness $H_V = 3.6$), 200 g of Polywax 655 (mfd. by BARECO Co., Ltd.; critical surface tension, $\gamma_c = 31$ dyne/cm) and 400 g of paraffin wax (SP-0145, compression modulus, $E = 15$ kg/mm$^2$) were charged in a 2 l-four-necked flask, and 1 g of n-butyl-4,4-bis-tert-butyl peroxyvaleate (Perhexa V, mfd. by Nihon Yushi K.K.; 10-hour half-life temperature of 105° C.) was added. The contents of the flask was heated to 150° C. and heat-treated for 2 hours.

The following composition including the above reaction product was kneaded at 120° C. for 3 hours by means of an attritor rotating at 200 rpm.

| | |
|---|---|
| The above reaction product | 70 wt. parts |
| Styrene-dimethylaminoethyl methacrylate copolymer (St-DM copolymer) | 30 wt. parts |
| Magnetite (average particle size: 0.3 μ, BL-220, mfd. by Titan Kogyo K.K.) | 80 wt. parts |

The kneaded product (core material) showed an apparent viscosity of 600 cps at a shear rate of 10 sec$^{-1}$ and an apparent viscosity of 6500 cps at a shear rate of 0.5 sec$^{-1}$, respectively at 120° C.. The magnetite particles in the kneaded product showed a maximum particle size as agglomerate (secondary particle size) of 1.5 μ.

Separately, 20 l of water and 20 g of hydrophilic silica negatively chargeable in water (Aerosil #200, mfd. by Nihon Aerosil K.K.) were charged in 20 l-Agihomomixer (mfd. by Tokushu Kika Kogyo K.K.) and heated to 90° C.. Into the dispersion medium, 1 kg of the above kneaded product (core material) was charged and formed into particles under the conditions of a peripheral speed of 20 m/sec, and a pass number of 6.9 times/min for 1 hour. After the particle formation, the dispersion was cooled to 30° C. by means of a heat exchanger, and 50 g of sodium hydroxide was added into the dispersion, followed by stirring for 5 hours to dissolve the silica for removed. The spherical core particles thus obtained contained no remaining silica as a result of fluorescent X ray analysis. The core particles were further subjected to filtration and washing with water by using a centrifugal separator. As a result, core particles having a number-average particle size of 9.1 μm and a volume-average particle size of 10.5 μm (coefficient of variation = 18.7%) were obtained at a yield of 5%.

On the other hand, into a 1 l-flask equipped with Auto-homomixer (mfd. by Tokushu Kika Kogyo K.K.), a thermometer and a pH meter, 320 g of isopropyl alcohol and 80 g of water were charged, followed by addition of 8 g (for providing a prescribed shell thickness $\delta = 0.2$ μm) of St-MMA-DM copolymer (copolymerization mol ratio = 60:30:10, $Mw = 6.7 \times 10^4$ $Mn = 2.68 \times 10^4$, Mw/Mn = 2.5, Tg = 85.5° C.) as a shell material of a vinyl type copolymer, and further by addition of 8 g of acetic acid to dissolve the above copolymer resin. The pH at this time was 5.0.

While the system temperature was kept at 0° C., 100 g of the previously obtained core particles were charged in the above-obtained shell material solution, followed by 5 min of stirring at 4000 rpm to sufficiently disperse the core particles.

Into the dispersion, 28% ammonia water was gradually added dropwise at a rate of 1.5 cc/min until the system reached a pH of 10 to effect encapsulation. After the encapsulation, the dispersion was subjected to centrifugal separation by means of a small-size centrifuge and the encapsulation product was sufficiently washed further with 2 l of water to obtain an encapsulated toner at a yield of 95%.

Separately, the filtrate from the centrifuge was condensed by means of a rotary evaporator and then mixed with xylene. The mixture was charged into a separating funnel to separate the xylene layer and remove the xylene to recover the non-used shell material. By measuring the weight of the non-used shell material, it was found that 97.8% of the shell material charged was effectively used for the encapsulation.

The thus prepared encapsulated toner showed a particle size distribution in terms of a number-particle size of 11.2 $\mu$m (coefficient of variation=18.0%). This particle size distribution suggests that the encapsulation proceeded with little free shell formation or coalescence. The triboelectric charge of the encapsulated toner was measured to be +17.0 $\mu$-C (Coulomb)/g according to the method described in U.S. Pat. No. 4,302,201. Also from this data, it is understood that the core particles were sufficiently coated with the shell material.

The obtained encapsulated toner was applied to image formation by means of an electrophotographic copier with a pressure-fixing device (PC-30, mfd. by Canon K.K.), whereby the resultant images showed sufficient image densities and fixability. More specifically, as a result of measurement by means of a McBeth reflection densitometer, the fixed images showed an image density of 1.5 under normal temperature-normal humidity conditions (23° C., 65% RH), 1.4 under high temperature-high humidity conditions (32.5° C., 90% RH) and 1.6 under low temperature-low humidity understood that the encapsulated toner obtained in the above-described manner had excellent environmental characteristic and developing characteristic.

COMPARATIVE EXAMPLE 100 g of 5 wt. % aqueous solution of gum arabic adjusted to pH 10 was charged in a 1 l-flask and warmed at 40° C.. Into the aqueous solution, 100 g of core particles produced in the same manner as in Example 1 were charged and dispersed for 5 min by means of Autohomomixer rotating at 75000 rpm, followed by addition of 100 g of 5 wt. % aqueous solution of gelatine adjusted to pH 10 and 100 g of water. Into the resultant liquid mixture, 1 wt. % aqueous solution of acetic acid was added dropwise until the pH of the system reached 4.4. Then, the liquid was poured into 500 g of cold water at 0° C. and the mixture was held at 5° C. for 1 hour followed by addition of 5 g of 37 wt. % formaldehyde aqueous solution. Then, the system was brought to pH 9 by the addition of 0.1 N-NaOH aqueous solution and warmed at 50° C. to harden the shell formed through the above complex coacervation process. Then, the product was filtrated and dried in normal way to prepare an encapsulated toner.

The resultant encapsulated toner showed apparently a very broad particle size distribution, and agglomerates of a plurality of encapsulated toner particles coalescent together were observed therein. As a result of measurement of particle size distribution, the encapsulated toner was found to contain more than 50 vol. % of particles having sizes of over 20 $\mu$m.

The triboelectric charge of the encapsulated toner was measured at about 1 $\mu$C/g. When the encapsulated toner was subjected to a copying test in the same manner as in Example 1, fixed images with an image density of below 0.4 were obtained under normal temperature-normal humidity conditions, and the image density was further lowered under high temperature-high humidity conditions.

EXAMPLE 2

| | |
|---|---|
| St-I-DM copolymer | 8 g |
| (copolymerization mol ratio = 75:5:20, | |
| Mn = 10$^4$, Mw = 3.6 $\times$ 10$^4$, Mw/Mn = 3.6, | |
| Tg = 80.0° C.) | |
| Acetic acid | 8 g |
| Isopropyl alcohol | 200 g |
| Butyl cellosolve | 10 g |
| Water | 200 g |

The above ingredients were respectively treated in the same manner as in Example 1 in a 1 l-flask to provide a shell material solution (for providing a shell thickness of 0.2 $\mu$m).

Into the shell material solution thus obtained, 100 g of core particles produced in the same manner as in Example 1 were charged and dispersed for 5 min by means of Autohomomixer rotating at 5000 rpm while maintaining the system temperature at 5° C., whereby the core particles were sufficiently dispersed similarly as in Example 1.

Into the dispersion, 28% ammonia water was gradually added at a rate of 1 cc/min until the pH of the system reached about 9 to effect encapsulation. Then, the dispersion was subjected to centrifugal separation by means of a small centrifuge and the product was sufficiently washed with 2 l of water to obtain an encapsulated toner.

The encapsulated toner thus obtained showed a number-average particle size of 10.1 $\mu$m and a volume-average particle size of 11.6 $\mu$m as a measurement by means of Coulter counter. The encapsulated toner showed a triboelectric charge of 18.5 $\mu$C/g when measured in the same manner as in Example 1. The encapsulated toner was used for image formation in the same manner as in Example 1 by means of PC-30 copier, whereby sufficient image density and fixability were attained similarly as in Example 1.

EXAMPLE 3

| | |
|---|---|
| Paraffin wax | 200 wt. parts |
| (PF 155° F., mfd. by Nihon Seiro K.K.) | |
| Polyethylene | 100 wt. parts |
| (Hiwax 200P, Mitsui Sekiyu Kagaku K.K.) | |
| Magnetite | 180 wt. parts |
| (average particle size: 0.3 $\mu$m, BL-250, | |
| Titan Kogyo K.K.) | |

The above components were melt-mixed at 150° C. and sprayed through a dual-fluid nozzle with an air temperature set to 120° C., followed by cooling, solidification and classification, to obtain magnetic core particles.

As a result of measurement by using a Coulter counter, the core particles showed a number-average particle size of 8.7 μm and a volume-average particle size of 10.5 μm.

Encapsulation was effected in the same manner as in Example 1 except that 100 g of the above core particles were used and 12.1 g (for providing a shell thickness of 0.30 μm) of St-MMA-BA-DE copolymer (copolymerization mol ratio=65:10:5:20, Mn=1.2×10$^4$, Mw=4.0×10$^{10}$, Mw/Mn=3.3) was used as the shell material.

The encapsulated toner thus obtained showed a number-average particle size of 9.6 μm, a volume-average particle size of 11.7 μm and a triboelectric charge of +16.5 μC/g.

EXAMPLE 4

Encapsulation was effected in the same manner as in Example 1 except that a mixture solvent system comprising 34.3 g of ethanol, 57 g of water and 10 g of glycerin was used for dissolving the shell material.

The encapsulated toner thus obtained showed a number-average particle size of 10.1 μm, a volume-average particle size of 11.5 μm and a triboelectric charge of +17.5 μC/g. The encapsulated toner was used for image formation in the same manner as in Example 1 by means of PC-30 copier, whereby sufficient image density and fixability were attained similarly as in Example 1.

EXAMPLE 5

1 kg of commercially available carnauba was (mfd. by Noda Wax K.K.) was charged in a 2 l-four-necked flask, and the flask was evacuated to a reduced pressure of 1-2 mmHg in a nitrogen atmosphere. While maintaining the reduced pressure, the content of the flask was heated to 250° C. and reacted for 8 hours. The carnauba wax thus treated had an acid value of 0.5.

400 g of the treated carnauba wax (Vickers hardness, H$_V$=3.6), 200 g of Polywax 655 (mfd. by BARECO Co., Ltd.; critical surface tension, $\gamma_c$=31 dyne/cm) and 400 g of paraffin wax (SP-0145, compression modulus, E=15 kg/mm$^2$) were charged in a 2 l-four-necked flask, and 1 g of n-butyl-4,4-bis-tert-butyl peroxyvaleate (Perhexa V, mfd. by Nihon Yushi K.K.; 10-hour half-life temperature of 105° C.) was added. The contents of the flask was heated to 150° C. and heat-treated for 2 hours.

The following composition including the above reaction product was kneaded at 120° C. for 3 hours by means of an attritor rotating at 200 rpm.

| | |
|---|---|
| The above reaction product | 70 wt. parts |
| Styrene-dimethylaminoethyl methacrylate copolymer (St-DM copolymer) | 30 wt. parts |
| Phthalocyanine Blue (average particle size: about 0.1μ) | 5 wt. parts |

The colorant particles in the kneaded product showed a maximum particle size as agglomerate (secondary particle size) of 0.5 μ.

Separately, 20 l of water and 20 g of hydrophilic silica negatively chargeable in water (Aerosil #200, mfd. by Nihon Aerosil K.K.) were charged in 20 l-Agihomomixer (mfd. by Tokushu Kika Kogyo K.K.) and heated to 90° C.. Into the dispersion medium, 1 kg of the above kneaded product (core material) was charged and formed into particles under the conditions of a peripheral speed of 20 m/sec, and a pass number formation, the dispersion was cooled to 30° C. by means of a heat exchanger, and 50 g of sodium hydroxide was added into the dispersion, followed by stirring for 5 hours to dissolve the silica for removal. The spherical core particles thus obtained contained no remaining silica as a result of a fluorescent X ray analysis. The core particles were further subjected to filtration and washing with water by using a centrifugal separator. As a result, core particles having a number-average particle size of 8.9 μm and a volume-average particle size of 10.5 μm (coefficient of variation=18.1%) were obtained at a yield of 95%.

On the other hand, into a 1 l-flask equipped with Auto-homomixer (mfd. by Tokushu Kika Kogyo K.K.), a thermometer and a pH meter, 320 g of isopropyl alcohol and 80 g of water were charged, followed by addition of 8 g (for providing a prescribed shell thickness δ=0.2 μm) of St-MMA-DM copolymer (copolymerization mol ratio=60:30:10, Mw=6.7×10$^4$, Mw/Mn=2.5, Tg=85.5° C.) as a shell material of a vinyl type copolymer, and further by addition of 8 g of acetic acid to dissolve the above copolymer resin. The pH at this time was 5.0.

While the system temperature was kept at 0° C., 100 g of the previously obtained core particles were charged in the above-obtained shell material solution, followed by 5 min of stirring at 4000 rpm to sufficiently disperse the core particles.

Into the dispersion, 28% ammonia water was gradually added dropwise at a rate of 1.5 cc/min until the system reached a pH of 10 to effect encapsulation. After the encapsulation, the dispersion was subjected to centrifugal separation by means of a small-size centrifuge and the encapsulation product was sufficiently washed further with 2 l of water to obtain an encapsulated toner at a yield of 95%.

Separately, the filtrate from the centrifuge was condensed by means of a rotary evaporator and then mixed with xylene. The mixture was charged into a separating funnel to separate the xylene layer and remove the xylene to recover the non-used shell material. By measuring the weight of the non-used shell material, it was found that 97.8% of the shell material charged was effectively used for the encapsulation.

The thus prepared encapsulated blue particles showed a particle size distribution in terms of a number-average particle size of 9.5 μm, and a volume-average particle size of 11.0 μm (coefficient of variation=18.0%). This particle size distribution suggests that the encapsulation proceeded with little free shell formation or coalescence. The triboelectric charge of the encapsulated toner was measured to be +20.0 μ-Coulomb/g according to the method described in U.S. Pat. No. 4,302,201. Also from this data, it is understood that the core particles were sufficiently coated with the shell material.

100 parts of the above obtained blue capsules were mixed with 0.5 part of positively chargeable treated colloidal silica to form a toner for use in the following developing operation.

100 g of magnetic particles (carrier) comprising ferrite particles (particle size: 60-80 μm) surface-coated with styrene-butyl acrylate copolymer (copolymerization ratio=30:70) and 10 g of the above toner were mixed to prepare a developer. The developer was charged in a developing apparatus which had a schematic side sectional as shown in the figure in the accompanying drawing and comprised a drum (latent image-bearing member) 3, a sleeve (toner-carrying member)

22, a fixed magnet 23, a non-magnetic blade 24, a member 26 for regulating the circulation of magnetic particles, magnetic particles (carrier) 27, a non-magnetic encapsulated toner 28, a developer collecting chamber 29, a scattering prevention member 30, a magnetic member 31, a developing zone 32 and a bias voltage supply 34. The developing apparatus was incorporated in an electrophotographic copier equipped with a pressure-fixing device (PC-30, mfd. by Canon K.K.), and image formation was effected. As a result, the resultant images showed sufficient image densities and fixability. More specifically, the fixed images showed an image density of 1.5 under normal temperature-normal humidity conditions (23° C., 65% RH), 1.5 under high temperature-high humidity conditions (32.5° C., 90% RH), and 1.5 under low temperature-low humidity conditions (15° C., 10% RH).

EXAMPLE 6

A shell material solution was prepared in the same manner as in Example 5 except that St-IP-DM copolymer ($Mn=1.0\times 10^4$, $Mw=3.6\times 10^4$, $Mw/Mn=3.6$, $Tg=80.0°$ C.) was used as the shell material, and a solvent mixture comprising 200 g of isopropyl alcohol and 200 g of water and further 10 g of butyl cellosolve were used for dissolving the shell material.

Encapsulation was effected in the same manner as in Example 5 by using the shell material solution thus obtained, whereby encapsulated blue particles were obtained, showing a number-average particle size of 9.7 $\mu$m, a volume-average particle size of 11.5 $\mu$m, and a triboelectric charge of $+19.0$ $\mu$C/g.

A toner was prepared by using the encapsulated blue particles in the same manner as in Example 5 and used for imaging in the same manner as in Example 5, whereby sufficient image density and fixability were attained.

EXAMPLE 7

| | |
|---|---|
| Paraffin wax (PF 155° F., mfd. by Nihon Seiro K.K.) | 200 wt. parts |
| Polyethylene (Hiwax 200P, Mitsui Sekiyu Kagaku K.K.) | 100 wt. parts |
| Pigment Yellow (average particle size: about 0.1$\mu$) | 30 wt. parts |

The above components were melt-mixed at 150° C. and sprayed through a dual-fluid nozzle with an air temperature set to 120° C., followed by cooling, solidification and classification, to obtain core particles.

As a result of measurement by using a Coulter counter, the core particles showed a number-average particle size of 8.7 $\mu$m and a volume-average particle size of 10.5 $\mu$m.

Encapsulation was effected in the same manner as in Example 1 except that 65 g of the above core particles were used and 12.1 g (for providing a shell thickness of 0.30 $\mu$m) of St-MMA-BA-DE copolymer (copolymerization mol ratio=65:10:5:20, $Mn=1.2\times 10^4$, $Mw=4.0\times 10^4$, $Mw/Mn=3.3$) was used as the shell material.

The encapsulated particles thus obtained showed a number-average particle size of 9.6 $\mu$m, a volume-average particle size of 11.6 $\mu$m and a triboelectric charge of $+18.6$ $\mu$C/g.

When the encapsulated particles were used for preparation of a toner and image formation in the same manner as in Example 5, whereby sufficient image density and fixability were attained.

EXAMPLE 8

Encapsulation was effected in the same manner as in Example 5 except that a mixture solvent system comprising 34.3 g of ethanol, 57 g of water and 10 g of glycerin was used for dissolving the shell material.

The encapsulated particles thus obtained showed a number-average particle size of 9.9 $\mu$m, a volume-average particle size of 11.4 $\mu$m and a triboelectric charge of $+20.5$ $\mu$C/g.

When the encapsulated particles were used for preparation of a toner and image formation in the same manner as in Example 5, whereby sufficient image density and fixability were attained.

EXAMPLE 9

Core particles were prepared in the same manner as in Example 1.

On the other hand, into a 1 l-flask equipped with Auto-homomixer (mfd. by Tokushu Kika Kogyo K.K.), a thermometer and a pH meter, 320 g of isopropyl alcohol and 80 g of water were charged, followed by addition of 8 g (for providing a prescribed shell thickness $\delta=0.2$ $\mu$m) of St-(IPA-MA) copolymer (copolymerization mol ratio=70:30, $Mn=1.4\times 10^4$, $Mw=3.9\times 10^4$, $Mw/Mn=2.7$, acid value=95) as a shell material, and further by addition of 8 g of 28%-ammonia water to dissolve the above copolymer resin. The pH at this time was 9.0.

While the system temperature was kept at 0° C., 100 g of the previously obtained core particles were charged in the above-obtained shell material solution, followed by 5 min of stirring at 4000 rpm to sufficiently disperse the core particles.

Into the dispersion, glacial acetic acid was gradually added in about 40 min until the system reached a pH of 4 to effect encapsulation. After the encapsulation, the dispersion was subjected to centrifugal separation by means of a small-size centrifuge and the encapsulation product was sufficiently washed further with 2 l of water to obtain an encapsulated toner at a yield of 95%.

Separately, the filtrate from the centrifuge was condensed by means of a rotary evaporator and then mixed with xylene. The mixture was charged into a separating funnel to separate the xylene layer and remove the xylene to recover the non-used shell material. By measuring the weight of the non-used shell material, it was found that 97.8% of the shell material charged was effectively used for the encapsulation.

The thus prepared encapsulated toner showed a particle size distribution in terms of a number-average particle size of 9.9 $\mu$m, and a volume-average particle size of 11.2 $\mu$m (coefficient of variation = 18.0%). This particle size distribution suggests that the encapsulation proceeded with little free shell formation or coalescence. The triboelectric charge of the encapsulated toner was measured to be $-17.0$ $\mu$-Coulomb/g according to the method described in U.S. Pat. No. 4,302,201. Also from this data, it is understood that the core particles were sufficiently coated with the shell material.

100 parts of the above-obtained encapsulated toner was mixed with 0.4 part of negatively chargeable hydrophobic silica externally added and stirred in a coffee mil to obtain a silica-added encapsulated toner.

The silica-added encapsulated toner was applied to an electrophotographic copying machine equipped with an amorphous silicon (α-Si) photosensitive drum (a modification of NP-3525 mfd. by Canon K.K.), and image formation was effected by developing an electrostatic latent image on the photosensitive drum with the toner, the resultant toner image was transferred onto plain paper and fixed thereon by means of an external pressure-fixing device (average linear pressure of 15.0 kg/cm), whereby images with sufficient density and fixability were obtained. More specifically, the fixed images showed an image density of 1.35 under normal temperature-normal humidity conditions (23° C., 65% RH), 1.2 under high temperature-high humidity conditions (32.5° C., 90% RH), and 1.4 under low temperature-low humidity conditions (15° C., 10% RH).

EXAMPLE 10

| | |
|---|---|
| St-(n-PA—MA) copolymer (copolymerization mol ratio = 7:3, $Mn = 1.4 \times 10^4$, $Mw = 3.8 \times 10^4$, Mw/Mn = 2.7, acid value = 85) | 8 g |
| 28% Ammonia water | 8 g |
| Isopropyl alcohol | 200 g |
| Water | 200 g |

The above ingredients were respectively treated in the same manner as in Example 9 in a 1 l-flask to provide a shell material solution (for providing a shell thickness of 0.2 μm).

Into the shell material solution thus obtained, 100 g of core particles produced in the same manner as in Example 9 were charged and dispersed for 5 min by means of Autohomomixer rotating at 5000 rpm while maintaining the system temperature at 5° C., whereby the core particles were sufficiently dispersed similarly as in Example 9.

Into the dispersion, glacial acetic acid was gradually added at a rate of 1 cc/min until the pH of the system reached about 4 to effect encapsulation. Then, the dispersion was subjected to centrifugal separation by means of a small centrifuge and the product was sufficiently washed with 2 l of water to obtain an encapsulated toner.

The encapsulated toner thus obtained showed a number-average particle size of 10.1 μm and a volume-average particle size of 11.6 μm as a measurement by means of Coulter counter. The encapsulated toner showed a triboelectric charge of −18.5 μC/g when measured in the same manner as in Example 9. The encapsulated toner was used for image formation in the same manner as in Example 9 by means of the modified NP-3525 copier, whereby sufficient image density and fixability were attained similarly as in Example 9.

EXAMPLE 11

| | |
|---|---|
| Paraffin wax (PF 155° F., mfd. by Nihon Seiro K.K.) | 200 wt. parts |
| Polyethylene (Hiwax 200P, Mitsui Sekiyu Kagaku K.K.) | 100 wt. parts |
| Magnetite (BL-250, Titan Kogyo K.K.) | 180 wt. parts |

The above components were melt-mixed at 150° C. and sprayed through a dual-fluid nozzle with an air temperature set to 120° C., followed by cooling, solidification and classification, to obtain magnetic core particles.

As a result of measurement by using a Coulter counter, the core particles showed a number-average particle size of 8.7 μm and a volume-average particle size of 10.5 μm.

Encapsulation was effected in the same manner as in Example 9 except that 100 g of the above core particles were used and a mixture solvent system comprising 300 g of isopropyl alcohol, 10 g of 15N-sodium hydroxide aqueous solution and 100 g of water was used for dissolving the shell material.

The encapsulated toner thus obtained showed a number-average particle size of 9.8 μm, a volume-average particle size of 11.9 μm and a triboelectric charge of −16.2 μC/g.

EXAMPLE 12

Encapsulation was effected in the same manner as in Example 10 except that a mixture solvent system comprising 330 g of methanol, 50 g of water, 10 g of glycerin and 8 g of 15N-potassium hydroxide aqueous solution was used for dissolving the shell material.

The encapsulated toner thus obtained showed a number-average particle size of 9.9 μm, a volume-average particle size of 10.9 μm and a triboelectric charge of −17.1 μC/g. The encapsulated toner was used for image formation in the same manner as in Example 9 by means of the modified NP-3525 copier, whereby sufficient image density and fixability were attained similarly as in Example 10.

EXAMPLE 13

An encapsulated toner was prepared in the same manner as in Example 9 except that the non-magnetic core particles containing phthalocyanine blue were used. The thus prepared encapsulated toner could be effectively used as a negatively chargeable toner for a two-component type developer.

What is claimed is:

1. A process for producing an encapsulated toner, comprising:
    preparing a solution of a shell material resin set to an acidic pH region or a basic pH region wherein the shell material resin comprises a vinyl copolymer having a number-average molecular weight of 5,000 to 40,000, said shell material resin being dissolved in an aqueous medium containing an organic solvent having a solubility parameter of at least 11.0,
    dispersing solid core particles in the solution to form a dispersion,
    changing the pH of the dispersion to a pH region where the shell material resin is precipitated from the dispersion, and
    coating the core particles with the precipitated shell material resin.

2. A process according to claim 1, wherein the solution of the shell material resin is set to an acidic pH region, the solid core particles are dispersed in the solution, and the pH of the dispersion is changed to a basic pH region to precipitate the shell material resin.

3. A process according to claim 2, wherein the core particles have a pressure fixability.

4. A process according to claim 1, wherein said organic solvent is a lower alcohol.

5. A process according to claim 4, wherein said organic solvent is a lower alcohol having 1-5 carbon atoms.

6. A process according to claim 2, wherein said shell material resin comprises a resin formed from a monomer (A) providing a film-formability (A), a monomer (B1) providing a proton-attracting function (B1) of forming a proton-added product under the action of an acidifying agent in an aqueous medium, and a monomer (C) providing mainly a solubility-promoting function (C) of providing the proton-added product with a solubility in the aqueous medium.

7. A process according to claim 6, wherein said monomer (A) is styrene (St); said monomer (B1) is N,N-dimethylaminoethyl methacrylate (DM) or N,N-diethylaminoethyl methacrylate (DE); and said monomer (C) is a monomer selected from the group consisting of methyl methacrylate (MMA), 2-ethylhexyl methacrylate (2EHA), n-butyl methacrylate (BMA), butadiene (BD), isoprene (IP) and acrylonitrile (AN).

8. A process according to claim 6, wherein said shell material resin is a vinyl copolymer selected from the group consisting of St-MMA-DM copolymer St-MAA-DE copolymer, St-2EHA-DM copolymer, St-MMA-2EHA-DM copolymer, St-MMA-MBA-DM copolymer, St-MMA-BD-DM copolymer, St-MMA-IP-DM copolymer and St-AN-MMA-DM copolymer.

9. A process according to claim 1, wherein said shell material resin has a number-average molecular weight of 10,000 to 30,000.

10. A process according to claim 1, wherein said shell material resin has a ratio of weight-average molecular weight/number-average molecular weight in the range of 1.5–4.5, and a glass transition temperature of 40° C. or higher.

11. A process according to claim 10, wherein said shell material resin has a glass transition temperature of 60°–120° C.

12. A process according to claim 6, wherein said shell material resin is a vinyl copolymer formed from 30–90 mol % of the monomer (A), 5–65 mol % of the monomer (B1), and 5–30 mol % of the monomer (C).

13. A process according to claim 1, wherein said shell material resin is contained in a proportion of 0.5–20 wt. parts per 100 wt. parts of the aqueous medium.

14. A process according to claim 13, wherein said shell material resin is contained in a proportion of 1.0–10 wt. parts per 100 wt. parts of the aqueous medium.

15. A process according to claim 2, wherein said solution of the shell material resin is set to a pH value of $5\pm1.5$.

16. A process according to claim 15, wherein said shell material resin is dissolved in the aqueous medium with the aid of an acidifying agent to provide said solution of the shell material resin.

17. A process according to claim 1, wherein the precipitation of the shell material resin is effected at a temperature of $-10°$ to $+30°$ C.

18. A process according to claim 1, wherein the precipitation of the shell material resin is effected at a temperature of $-10°$ to $+5°$ C.

19. A process according to claim 2, wherein the pH of the dispersion is changed by adding a basifying agent to the dispersion.

20. A process according to claim 19, wherein said basifying agent is added to the dispersion at a rate H (ml/min) satisfying the following condition:

$(H/F \times G) = 0.005$ to 20, wherein F denotes the concentration of the shell material resin in the aqueous medium (g/l), and G denotes the amount of the aqueous medium (l).

21. A process according to claim 19, wherein said basifying agent is a basic substance selected from the group consisting of sodium hydroxide, potassium hydroxide, calcium hydroxide, ammonia gas, ethylenediamine, diethylene triamine, triethylene-diamine and aqueous solutions of these.

22. A process according to claim 21, wherein the basifying agent is ammonia water.

23. A process according to claim 1, wherein the solid core particles are dispersed in the solution in a proportion of 10–50 wt. parts per 100 parts of the aqueous medium constituting the solution.

24. A process according to claim 3, wherein said solid core particles comprise at least two of the following resins or waxes (a)–(c);
(a) a resin or wax with a hardness-imparting function having a Vickers hardness of 2–8 $kg/mm^2$ as measured under a weight of 10 g applied for 15 sec;
(b) a resin or wax with a releasability-imparting function having a critical surface tension of 15–40 dyne/cm at 20° C.; and
(c) a resin or wax with a fixability-imparting function having a compression modulus of 0.1–50 $kg/mm^2$.

25. A process according to claim 24, wherein said solid core particles comprise a binder resin obtained by heating said at least two of the resins or waxes (a)–(c) in the presence of a radical generating agent.

26. A process according to claim 1, wherein said solid core particles comprise 15–180 wt. parts of a magnetic substance per 100 wt. parts of the resinous component therein.

27. A process according to claim 26, wherein said solid core particles comprise 50–150 wt. parts of the magnetic substance per 100 wt. parts of the resinous component therein.

28. A process according to claim 1, wherein said solid core particles comprise 0.1–20 wt. parts of a colorant per 100 wt. parts of the resin component therein.

29. A process according to claim 2, wherein said solid core particles are coated with a 0.01–2.0 μm-thick shell having a triboelectric chargeability.

30. A process according to claim 1, wherein the solution of the shell material resin is set to a basic pH region, the solid core particles are dispersed in the solution, and the pH of the dispersion is changed to an acidic pH region to precipitate the shell material resin.

31. A process according to claim 30, wherein the core particles have a pressure-fixability.

32. A process according to claim 30, wherein said shell material resin is dissolved in an aqueous medium comprising water and an organic solvent having a solubility parameter of 11.0 or higher.

33. A process according to claim 32, wherein said organic solvent is a lower alcohol.

34. A process according to claim 33, wherein said organic solvent is a lower alcohol having 1–5 carbon atoms.

35. A process according to claim 30, wherein said shell material resin comprises a resin formed from a monomer (A) providing a film-formability (A), a monomer (B2) providing a dissociative function (B2) of forming a dissociated product under the action of a basifying agent in an aqueous medium, and a monomer (C) providing mainly a solubility-promoting function (C) of providing the dissociated product with a solubility in the aqueous medium.

36. A process according to claim 35, wherein the monmer (B2) also has a function of the monomer (C).

37. A process according to claim 36, wherein the monomer (B2) is a maleic acid mono-alkyl ester or methacrylic acid.

38. A process according to claim 35, wherein said shell material resin has a number-average molecular weight of 5,000 to 40,000.

39. A process according to claim 35, wherein said shell material resin has a number-average molecular weight of 10,000 to 30,000.

40. A process according to claim 35, wherein said shell material resin has a ratio of weight-average molecular weight/number-average molecular weight in the range of 1.5-4.5, and a glass transition temperature of 40° C. or higher.

41. A process according to claim 40, wherein said shell material resin has a glass transition temperature of 60°-120° C.

42. A process according to claim 32, wherein said shell material resin is contained in a proportion of 0.5-20 wt. parts per 100 wt. parts of the aqueous medium.

43. A process according to claim 42, wherein said shell material resin is contained in a proportion of 1.0-10 wt. parts per 100 wt. parts of the aqueous medium.

44. A process according to claim 30, wherein said solution of the shell material resin is set to a pH value of 8-10.

45. A process according to claim 44, wherein said shell material resin is dissolved in the aqueous medium with the aid of a basifying agent to provide said solution of the shell material resin.

46. A process according to claim 30, wherein the precipitation of the shell material resin is effected at a temperature of −10° to +30° C.

47. A process according to claim 46, wherein the precipitation of the shell material resin is effected at a temperature of −10° to +5° C.

48. A process according to claim 30, wherein the pH of the dispersion is changed by adding an acidifying agent to the dispersion.

49. A process according to claim 48, wherein said acidifying agent is added to the dispersion at a rate H (ml/min) satisfying the following condition:

$$(H/F \times G) = 0.005 \text{ to } 20,$$

wherein F denotes the concentration of the shell material resin in the aqueous medium (g/l), and G denotes the amount of the aqueous medium (l).

50. A process according to claim 48, wherein said acidifying agent is selected from the group consisting of hydrochloric acid, sulfuric acid, phosphoric acid, formic acid, acetic acid and succinic acid.

51. A process according to claim 50, wherein said acidifying agent is acetic acid.

52. A process according to claim 30, wherein the solid core particles are dispersed in the solution in a proportion of 10-50 wt. parts per 100 parts of the aqueous medium constituting the solution.

53. A process according to claim 31, wherein said solid core particles comprise at least two of the following resins or waxes (a)-(c):
  (a) a resin or wax with a hardness-imparting function having a Vickers hardness of 2-8 kg/mm² as measured under a weight of 10 g applied for 15 sec;
  (b) a resin or was with a releasability-imparting function having a critical surface tension of 15-40 dyen/cm at 20° C.; and
  (c) a resin or wax with a fixability-imparting function having a compression modulus of 0.1-50 kg/mm².

54. A process according to claim 53, wherein said solid core particles comprise a binder resin obtained by heating said at least two of the resins or waxes (a)-(c) in the presence of a radical generating agent.

55. A process according to claim 53, wherein said solid core particles comprise 15-180 wt. parts of a magnetic substance per 100 wt. parts of the resinous component therein.

56. A process according to claim 55, wherein said solid core particles comprise 50-150 wt. parts of the magnetic substance per 100 wt. parts of the resinous component therein.

57. A process according to claim 53, wherein said solid core particles comprise 0.1-20 wt. parts of a colorant per 100 wt. parts of the resin component therein.

58. A process according to claim 30, wherein said solid core particles are coated with a 0.01-2.0 μm-thick shell having a triboelectric chargeability.

* * * * *

UNITED STATES PATENT AND TRADEMARK OFFICE
CERTIFICATE OF CORRECTION

PATENT NO. : 4,904,562    Page 1 of 4

DATED : February 27, 1990

INVENTOR(S) : Hiroshi Yusa et al.

It is certified that error appears in the above-identified patent and that said Letters Patent is hereby corrected as shown below:

IN THE TITLE:
    On the title page, item [54] and in col. 1. lines 1 and 2
    "PROCESS FOR PRODUCING ENCAPSULATED TONER" should read
    --PROCESS FOR PRODUCING ENCAPSULATED TONER USING
    PRECIPITATED VINYL COPOLYMER--.

COLUMN 2:

Line 22, "or" should read --for--.

Line 57, "hydrophillic" should read --hydrophilic--.

COLUMN 6:

Line 35, "bistert-" should read --bis-tert--.

COLUMN 8:

Line 23, "a" should read --as--.

COLUMN 11:

Line 34, "abovementioned" should read --above-mentioned--.

UNITED STATES PATENT AND TRADEMARK OFFICE
CERTIFICATE OF CORRECTION

PATENT NO. : 4,904,562

DATED : February 27, 1990

INVENTOR(S) : Hiroshi Yusa et al.

It is certified that error appears in the above-identified patent and that said Letters Patent is hereby corrected as shown below:

COLUMN 11 (continued):

Line 51, "alkylor" should read --alkyl or--.

COLUMN 12:

Line 57, "become" should read --becomes--.

COLUMN 13:

Line 3, "present" should read --present invention--.

Line 59, "size" should read --size)--.

COLUMN 15:

Line 23, "water," (second occurrence) should read --water),--.

COLUMN 18:

Line 45, "removed." should read --removal.--.

Line 61, "$Mw=6.7 \times 10^4$" should read --$Mw=6.7 \times 10^4$,--.

UNITED STATES PATENT AND TRADEMARK OFFICE
CERTIFICATE OF CORRECTION

PATENT NO. : 4,904,562

DATED : February 27, 1990

INVENTOR(S) : Hiroshi Yusa et al.

It is certified that error appears in the above-identified patent and that said Letters Patent is hereby corrected as shown below:

COLUMN 19:

Line 20, "number-particle" should read --number-average particle size of 9.9 µm, and a volume-average--.

Line 39, "humidity un-" should read -- humidity conditions (15°C, 10% RH). From these data, it is un- --.

COLUMN 21:

Line 30, "carnauba was" should read --carnauba wax--.

Line 66, "number" should read --number of 6.9 times/min for 1 hour. After the particle--.

COLUMN 24:

Line 66, "mil" should read --mill--.

COLUMN 26:

Line 61, "pressure fixability." should read --pressure-fixability.--.

UNITED STATES PATENT AND TRADEMARK OFFICE
CERTIFICATE OF CORRECTION

PATENT NO. : 4,904,562

DATED : February 27, 1990

INVENTOR(S) : Hiroshi Yusa et al.

It is certified that error appears in the above-identified patent and that said Letters Patent is hereby corrected as shown below:

COLUMN 27:

Line 18, "copolymer St-MAA-" should read
      -- copolymer, St-MAA- --

COLUMN 28:

Line 18, "waxes (a)-(c);" should read -- waxes
    (a) - (c):--.

COLUMN 29:

Line 4, "monmer (B2)" should read --monomer (B2)--.

COLUMN 30:

Line 26, "was" should read --wax--.

Line 28, "dyen/cm" should read --dyne/cm--.

Signed and Sealed this

Fifth Day of January, 1993

Attest:

DOUGLAS B. COMER

Attesting Officer      Acting Commissioner of Patents and Trademarks